G. P. Sisson,
Clothes Drier,
Nº 68,317. Patented Aug. 27, 1867.
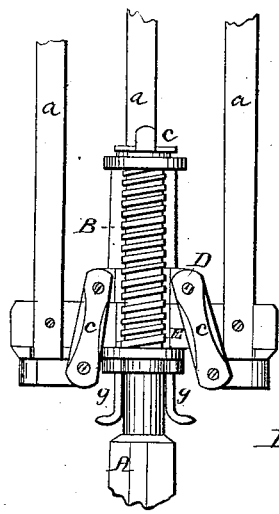
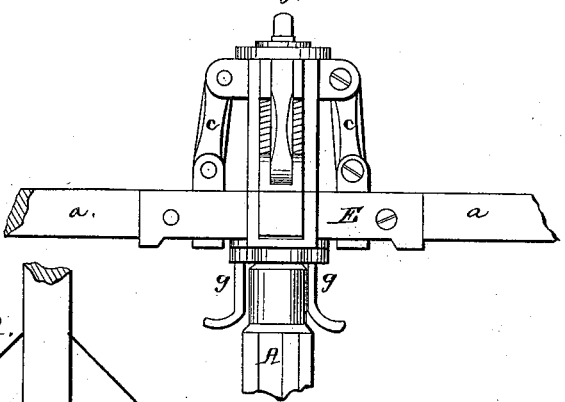
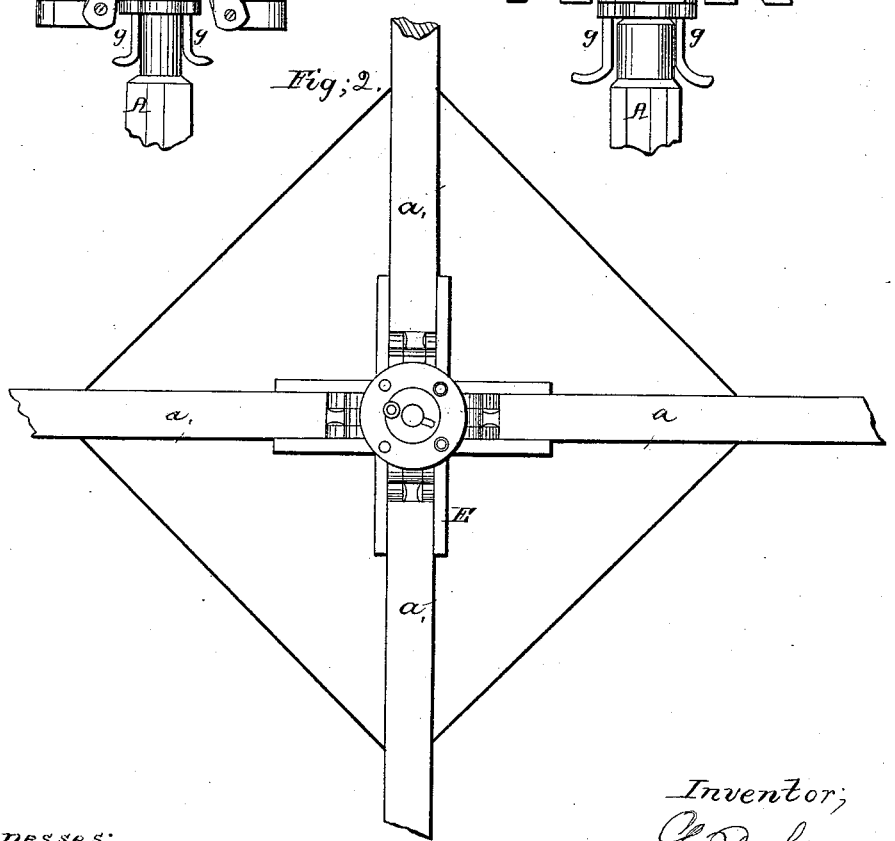
Witnesses:
Inventor;
Geo. P. Sisson
By his attys
Gardner & Hyde

United States Patent Office.

GEORGE P. SISSON, OF FLORENCE, MASSACHUSETTS.

Letters Patent No. 68,317, dated August 27, 1867.

IMPROVED CLOTHES-DRIER.

*The Schedule referred to in these Letters Patent and making part of the same.*

TO ALL WHOM IT MAY CONCERN:

Be it known that I, GEORGE P. SISSON, of Florence, Hampshire county, Commonwealth of Massachusetts, have invented a new and useful improved Clothes-Drying Rack; and I do hereby declare that the following is a full and exact description thereof, reference being had to the accompanying drawings, and to the letters of reference marked thereon. In the drawings—

Figure 1 represents a sectional view,

Figure 2 a plan, and

Figure 3 a side view of my invention.

This invention relates to a new and improved folding-reel for drying clothes, &c., the construction of which I will now describe. It is designed more particularly for the use of parties having a small amount of yard room in which to stretch their lines, and is so arranged that its arms may be closed together, thus making it occupy a comparatively small space when not in use.

Upon the top of a post, A, I arrange the screw B, which turns loosely upon a stud, C, attached to the top of the post. The arms $a\ a\ a$, &c., of the reel are pivoted to a frame, E, and are attached to a nut, D, (which runs on the screw B,) by means of connections $c\ c\ c$, pivoted to the projecting sides of the nut D and to the extreme ends of its arms $a\ a\ a$, &c. This frame E is slotted at the sides, and the projecting sides of the nut (to which the connections $c\ c$, &c., are attached,) extend into and are guided by these slots. To the bottom of the screw are attached projecting handles, $g\ g'$, by which the screw can be prevented from turning, and when the reel is turned and the screw held the nut is forced upwards or downwards, by the screw opening out or closing together the arms $a\ a$, &c., by means of the connections therewith aforementioned.

When the reel is extended it occupies but little room, while the line upon it may be of great length and afford room for a large quantity of clothes, and when the clothes are removed and the reel closed up it occupies the least possible space.

By this means I obtain a simple and compact arrangement to hang clothes upon while drying, and the arrangement for operating the arms is simple and effective.

Now, having described my invention, what I claim as new, and desire to secure by Letters Patent, is—

A clothes-drying reel, in which the arms are operated by means of a screw arranged in the centre.

GEORGE P. SISSON.

Witnesses:
EDWARD H. HYDE,
R. F. HYDE.